United States Patent

Linz

[11] Patent Number: 6,061,410
[45] Date of Patent: May 9, 2000

[54] FREQUENCY RATIO ESTIMATION ARRANGEMENT AND METHOD THEREOF

[75] Inventor: Alfredo R. Linz, Austin, Tex.

[73] Assignee: Advanced Micro Devices, Austin, Tex.

[21] Appl. No.: 08/810,338

[22] Filed: Feb. 27, 1997

[51] Int. Cl.[7] .......................... H04L 25/36; H04L 25/40; H04L 7/00
[52] U.S. Cl. .................. 375/371; 375/355; 375/372; 341/50; 341/61; 341/123; 370/516; 370/503; 370/545; 708/290; 708/300; 708/313
[58] Field of Search ..................... 341/61, 123, 143–144, 341/50; 364/723, 724.1, 724.011; 375/371, 324, 355, 372; 370/516, 503, 545; 708/290, 300, 313

[56] References Cited

U.S. PATENT DOCUMENTS

| | | | |
|---|---|---|---|
| 3,754,098 | 8/1973 | Abramson et al. | 375/371 |
| 4,564,918 | 1/1986 | McNally et al. | |
| 4,748,578 | 5/1988 | Lagadec et al. | |
| 4,780,892 | 10/1988 | Lagadec | |
| 4,825,398 | 4/1989 | Koch et al. | |
| 5,119,093 | 6/1992 | Vogt et al. | 341/123 |
| 5,331,346 | 7/1994 | Shields et al. | 348/441 |
| 5,351,087 | 9/1994 | Christopher et al. | 548/441 |
| 5,398,029 | 3/1995 | Toyama et al. | 341/61 |
| 5,457,456 | 10/1995 | Norsworthy | 341/61 |
| 5,471,411 | 11/1995 | Adams et al. | |
| 5,475,628 | 12/1995 | Adams et al. | 364/724.1 |
| 5,481,267 | 1/1996 | Miyabe et al. | 341/61 |
| 5,512,895 | 4/1996 | Madden et al. | 341/61 |
| 5,550,594 | 8/1996 | Cooper et al. | 348/513 |
| 5,559,513 | 9/1996 | Rothermel et al. | 341/61 |
| 5,617,088 | 4/1997 | Yasuda | 341/61 |
| 5,640,388 | 6/1997 | Woodhead et al. | 370/468 |
| 5,712,635 | 1/1998 | Wilson et al. | 341/144 |

OTHER PUBLICATIONS

Adams, R., et al., "A Stereo Asynchronous Digital Sample–Rate Converter for Digital Audio", *IEEE Journal of Solid–State Circuits*, 29(4):481–488 (Apr. 1994).

*Primary Examiner*—Stephen Chin
*Assistant Examiner*—Michael W. Maddox
*Attorney, Agent, or Firm*—Williams, Morgan & Amerson

[57] ABSTRACT

A communication system includes a data sampling rate converter that uses a closed-loop control arrangement to convert an input signal at a first sampling rate to a second, asynchronous, sampling rate without requiring extensive input buffering. A number of data registers in a first-in-first-out input buffer are used to receive and store data samples at the first rate and to pass the data samples from the input buffer at a controlled rate. The input buffer indicates the current capacity of the input buffer circuit for use by a frequency ratio estimation circuit, which is arranged to respond by providing an estimate of the actual ratio between the first rate and the second rate. A control circuit responds to the frequency ratio estimation circuit by generating the controlled rate at which the data samples are to be passed from the input buffer. In this manner, the data samples are passed from the input buffer at the controlled rate for processing and outputting the data at the second rate.

32 Claims, 5 Drawing Sheets

ND: 6,061,410

FREQUENCY RATIO ESTIMATION ARRANGEMENT AND METHOD THEREOF

FIELD OF THE INVENTION

The present invention relates generally to digital control arrangements. More particularly, the present invention relates to digital control arrangements used in connection with sampling rate conversion systems having an input signal of one frequency converted to an output signal of another frequency.

BACKGROUND OF THE INVENTION

The widespread use of digital signals has found its way into a variety of equipment and, in some form, into most industries. In many applications, the digital signals are presented to the equipment using one communication protocol and are then generated from the equipment using another communication protocol. For such applications, these communication protocols involve converting an input stream of the digital signals arriving at a first sampling data rate and permitting another equipment type to receive the signals at a second data sampling rate. Where these data rates are not equal, as in asynchronous data transfer schemes, maintaining accurate communication can be difficult.

The degree of difficulty typically depends on the type of system being used. Typical systems are designed with the expectations that the input and output sampling rates will have known nominal values and that the actual values will not depart significantly from the nominal values. The actual values, however, depend upon the characteristics of various circuits, such as crystal oscillators, which have a range of tolerances. These tolerances cause the actual values of the sampling rates to change over time. Depending on the application and the degree of signal integrity required, these changes can be highly problematic.

Consider, for example, a conventional sampling rate conversion system in which the converter operation is designed according to the known nominal values of the input and output sampling rates. Should the ratio of the input and output sampling rates significantly change from the nominal or expected value, the quality and efficiency of the communication can be severely degraded. For example, if the input sampling rate fs1 is higher than its nominal value, samples will arrive more often than they are processed by the sampling rate conversion system. This will typically result in the sampling rate conversion system losing or failing to process some of the input samples. If, on the other hand, the input sampling rate is less than its nominal value, the input samples will arrive less often and the sampling rate conversion system will attempt to process a new input sample even when none is actually available. In this situation, such a sampling rate conversion system might attempt to reuse a previously processed input sample. Processing input samples in this redundant manner will appreciably degrade the quality of the data information.

One previously known technique for addressing this problem involves the use of a large input buffer. An input buffer of this type receives input samples at a rate fs1 defined by an input clock. The sampling rate conversion system processes the readily available data input samples stored in the input buffer at an output sampling rate fs2. Where fs2 is appreciably greater than fs1, the large input buffer is used to provide an inventory of input data samples that can be processed in short spurts at a higher output sampling rate. Conversely, where the output sampling rate is appreciably less than the input sampling rate, the large input buffer is used as an overflow for input samples so as to permit output processing at a lower sampling rate. While large buffers mitigate these overflow and underflow problems, such buffers are costly and do not eliminate the problems.

Known sampling rate conversion systems also deal with a problem sometimes referred to as frequency offset. Frequency offset is evidenced when the reproduced signal at the output has a frequency that is different from the specified frequency. Frequency offset is a common problem and has been addressed in a variety of ways depending on the design of the sampling rate conversion system. Many of these designs require labor-intensive recalibration of the circuits. Other such designs require retransmission of the data whenever the frequency offset exceeds a certain specified threshold.

SUMMARY OF THE INVENTION

According to one aspect of the present invention, a system converts an input signal received at a first rate according to a first clock signal to an output signal generated at a second rate according to a second clock signal. For such an application, the present invention provides a data sampling conversion arrangement including: an input buffer circuit having a set of data storage registers arranged to pass received data samples at a variable rate; a current capacity signal generated by the input buffer circuit and indicative of the current use of the set of data storage registers; a ratio estimation circuit arranged to respond to the current capacity signal by providing an estimate of the actual ratio between the first rate and the second rate; and a control circuit responsive to at least one of the first and second clock signals and to the ratio estimation circuit and arranged to control the variable rate at which the data storage registers pass the received data samples.

According to another aspect of the present invention, a digital signal processing system processes an input signal received at a first rate and converts the input signal to an output signal generated at a second rate. The system includes: a first-in-first-out (FIFO) input buffer circuit having a set of data storage registers arranged to receive data samples for storage at the first rate and to pass the received data samples from the input buffer circuit at a controlled rate; a current capacity signal generated by the input buffer circuit and indicative of current use of the data storage registers; a frequency ratio estimation circuit arranged to respond to the current capacity signal by providing an estimate of the actual ratio between the first rate and the second rate; a control circuit, responsive to the frequency ratio estimation circuit, for generating the controlled rate at which the data samples are to be passed from the input buffer circuit; and a digital processing circuit constructed and arranged to receive the data samples passed from the input buffer circuit at the controlled rate and to output corresponding processed data samples at the second rate.

According to yet another aspect of the present invention, a digital signal conversion arrangement converts an input signal received at a first data rate to an output signal generated at a second data rate. The arrangement comprises: a buffer circuit, including a set of data storage registers, for receiving data samples for storage at the first rate and passing the received data samples from the buffer circuit at a controlled rate; a current capacity signaling circuit for indicating the current use of the data storage registers; a frequency ratio circuit, responsive to the current capacity signaling circuit and the first rate, for estimating the actual ratio between the first rate and the second rate; a control circuit, responsive to the frequency ratio estimation circuit, for generating the controlled rate at which the data samples are to be passed from the buffer circuit; and a digital signal processor for receiving the data samples passed from the buffer circuit at the controlled rate and outputting the data samples, as processed by the digital signal processor, at the second rate.

Another specific embodiment of the present invention is directed to a digital signal conversion arrangement for converting an input signal received at a first rate to an output signal generated at a second rate. This embodiment comprises: a FIFO buffer circuit, including a set of data storage registers, arranged to receive data samples for storage at the first rate, to pass the received data samples from the buffer means at a controlled rate, and to generate a current capacity indication; a frequency ratio detection circuit, including a filter circuit arranged to respond to the current capacity indication by providing a rate of error signal, a time-varying gain circuit arranged to respond to one of the first and second rates, and an integrator arranged to respond to the rate of error signal and the time varying gain circuit by providing an estimate of the ratio between the first rate and the second rate; a control circuit responsive to the estimate of the ratio between the first rate and the second rate and to the other of the first and second rates and constructed to generate the controlled rate at which the data samples are to be passed from the buffer circuit; and a signal processor for receiving the data samples passed from the buffer circuit at the controlled rate and outputting the data samples at the second rate.

Another aspect of the present invention is directed to a method for converting an input signal received at a first rate to an output signal generated at a second rate. The method comprises: using a set of data storage registers as an input buffer for receiving data samples for storage at the first rate and for passing the received data samples from the input buffer at a controlled rate; providing a quantity signal to indicate the quantity of the data samples that are currently stored in the set of data storage registers; in response to the quantity signal, estimating the actual ratio between the first rate and the second rate; and, in response to estimating the actual ratio, generating the controlled rate at which the data samples are to be passed from the set of data registers and outputting the data samples at the second rate.

Another aspect of the present invention is directed to a communication system incorporating one or more of the various above-summarized embodiments.

The above summary of the present invention is not intended to describe each disclosed embodiment of the present invention. This is the purpose of the figures and of the detailed description that follows.

BRIEF DESCRIPTION OF THE DRAWINGS

Other aspects and advantages of the invention will become apparent upon reading the following detailed description and upon reference to the drawings in which.

Figure 1:
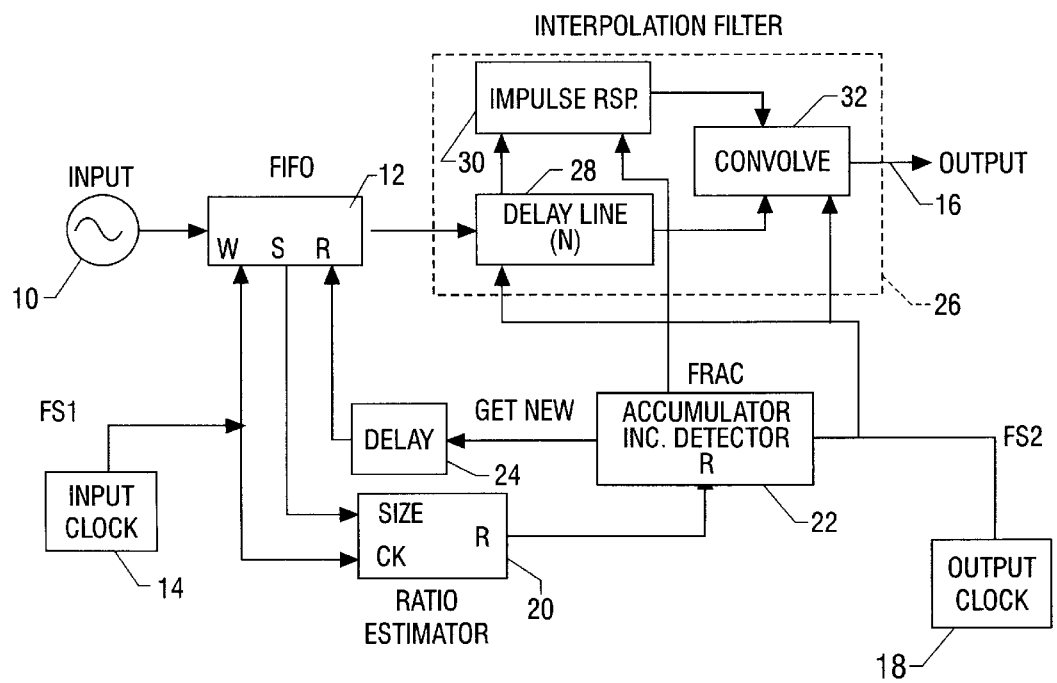
FIG. 1 is a block diagram illustrating a specific embodiment of the present invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE DISCLOSED EMBODIMENTS

The present invention is generally applicable to a variety of data signal processing environments. The present invention has been found to be particularly advantageous for sampling rate conversion applications, such as synthesizers and codecs, in which the input sampling rate differs from the output sampling rate and in which the ratio of the output sampling rate to the input sampling rate tends to fluctuate or is not known exactly. In accordance with the present invention, a specific implementation of a sampling rate conversion system addressing this type of environment is illustrated in FIG. 1.

The system of FIG. 1 includes a data input source 10 that provides data to an input buffer 12. The input buffer 12 samples the data at a sampling rate fs1 as determined by an input clock circuit 14. The system processes the data to develop an output stream of data at an output port 16, with the output data provided at a sampling rate fs2 corresponding to transitions of an output clock signal provided by an output clock circuit 18.

The ratio of the output sampling rate fs2 to the input sampling rate fs1 plays an important role for the system of FIG. 1. While the input and output sampling rates for many conversion applications are generally known, the actual sampling rates at any given time tend to vary and tend to depend on various factors that can be difficult to control. Departure of the ratio of the output sampling rate to the input sampling rate, fs2/fs1, from the expected or nominal ratio can produce unacceptable effects. These effects include losing input samples, for example, if the samples arrive faster than they are processed by the system, and having to reuse previously retrieved samples, for instance, when input samples arrive less frequently than expected.

Using a closed-loop, error-correcting arrangement, the system of FIG. 1 overcomes these problems. To track departures from the expected ratio, a ratio estimator 20 provides an ongoing recent estimate of the actual ratio, depicted as R in FIG. 1. This determination of the actual ratio value is used to adjust automatically the rate at which samples are passed through the input buffer 12 of FIG. 1. This adjustment allows for a relatively small buffer, e.g., having only three registers, to be used with little, if any, risk of losing or having to reuse input samples as the actual ratio departs from the expected nominal value. As will be described in further detail below, the system of FIG. 1 is designed to provide immediate correction, thereby quickly tracking and overcoming even slight variations in the sampling rates. This provides for precisely controlled data sampling to ensure that the input buffer 12 will be neither over-utilized nor under-utilized.

The ratio estimator 20, which partly accounts for this automatic R value correction, responds to two input signals. The first input signal is the input sampling clock signal provided by the input clock 14. The second input signal is provided by the input buffer 12 to indicate the capacity, or lack thereof, of the input buffer 12 to receive additional samples. This current capacity indication can be provided in a number of ways, including, for example, a multiple-bit indication in encoded or unencoded form to identify the number of data samples occupying data registers in the input buffer or the number of input buffer registers that are not currently storing data samples.

Various commercially available first-in-first-out (FIFO) memories of this type provide such a capacity indication by using a recent count of a increment/decrement counter, which increments each time a data sample is written to the memory and which decrements each time a data sample is read from the memory. For applications in which there is insufficient real estate for a large FIFO memory, a commercially available FIFO memory having no more than about four data registers can be used with the capacity indication being provided via unencoded multi-bit form.

With the ratio estimator 20 initially being set to a nominal ratio, the current input buffer capacity and input sampling rate are used to provide an accurate representation of the ratio as recent as the last transition in the FS1 clock signal. In the specific example of FIG. 1, the value of the ratio provided by the ratio estimator 20 is used as one of two inputs to an accumulator/increment detector 22. The other input to the accumulator/increment detector 22 is the output sampling rate provided by the output clock 18. The detector 22 uses the most recent estimate of the ratio value and the output sampling rate to control the processing of samples at the output end of the input buffer 12.

Consider, for example, a size value increase, value indicating that the input sampling rate fs1 has increased with respect to the output sampling rate fs2. To prevent the input buffer 12 from filling too close to full capacity, the ratio estimator adjusts the ratio value in such a way that the frequency of read operations from the input buffer 12 increases. This read instruction to the input buffer 12 occurs in response to clocked transitions provided at the input to the accumulator/increment detector 22.

In an alternative embodiment, the current actual ratio between the first rate and the second rate is obtained using the capacity indication from the input buffer 12 and the output sampling rate as inputs to the ratio estimator 20, with the detector 22 being designed to respond to the input sampling rate rather than the output sampling rate. This embodiment is most appropriate for applications in which fs2 is greater than fs1, which allow the processing to be done at the slower rate. For a more detail on this alternative embodiment, reference may be made to co-pending U.S. patent application entitled Arrangement for Asynchronous Decimation Using a Frequency Ratio Estimator and Method Thereof, U.S. patent application Ser. No. 08/807,836, filed concurrently herewith and incorporated herein by reference.

For particular applications benefiting from steady-state operations at all times, a delay circuit 24 is used at startup to permit the input buffer 12 to fill to a nominal level, for example, three registers, before the accumulator/increment detector 22 is permitted to cause a read from the input buffer 12. Thus, once the input buffer 12 is filled to the nominal level, the most recent estimate of the ratio value is used by the accumulator/increment detector 22 to process data samples out of the input buffer 12 and to maintain the capacity of the input buffer 12 close to the nominal level.

In the particular implementation of FIG. 1, the accumulator/increment detector 22 is initially set to zero. At each transition of the output clock signal FS2, the ratio value R is added to the accumulator. So long as the accumulated number does not transition to the next integer, the same input data are used by the interpolation filter 26 to produce an output value at output port 16 at a specified clock rate, corresponding to fs2 as illustrated in FIG. 1. In this manner, no new data samples are shifted into the delay line 28, since the accumulator/increment detector 22 prevents data from being output from the input buffer 12 until after the integer part of the accumulator is incremented. As soon as the integer part of the accumulator is incremented, a new data sample is taken from the input buffer 12 and shifted into the delay line 28. To accommodate this aspect of the conversion system of FIG. 1, the circuit depicted as item 22 of FIG. 1 includes both an accumulator circuit as well as an increment detector which indicates when the accumulator has transitioned up to the next integer.

With the accumulator/increment detector 22 selectively enabling reads of the data samples from the input buffer 12, the passed data samples are presented to the delay line 28 for processing as required for the particular application design, and passed to the output port 16. The system illustrated in FIG. 1 exemplifies an application wherein the passed data samples are processed using a finite-impulse-response (FIR) low-pass interpolation filter 26. In the particular embodiment illustrated, the transfer function coefficients are determined for each fs2 period, by the fractional output signal from the detector 22.

The FIR filter can be implemented using discrete hardware or using any of several commercially-available digital signal processor circuit arrangements programmed to process data samples passed from the input buffer 12 using coefficients as determined for the specified filtering application. Where a digital signal processor circuit arrangement is used to implement the FIR filter, the operations of the ratio estimator 20 and the detector 22 can also be programmed into the same or a different digital signal processor chip. The benefits of implementing processing of this type as programmed digital signal processor circuits or as discrete hardware circuits typically depend on the application at hand.

Accordingly, the illustrated interpolation filter 26 is depicted generally as including a delay line 28, an impulse response circuit 30, and a convolution circuit 32. The delay line 28, which may be implemented using any of several commercially available devices or in integrated form, stores N data samples output from the input buffer 12. The variable N is selected consistent with the size of the interpolation filter being used. The impulse response circuit 30 and the convolution circuit 32 apply the specified transfer function to the data stored in the delay line 28 at each cycle of FS2. For more information concerning a hardware or software implementation for this type of digital processing circuitry, or specifics concerning the illustrated filter or alternative types of digital filters, reference may be made to "Digital Signal Processing," Emmanuel C. Ifeachor and Barrie W. Jervis, Addison-Wesley, 1993 (e.g., chs. 5 and 6).

Figure 2:
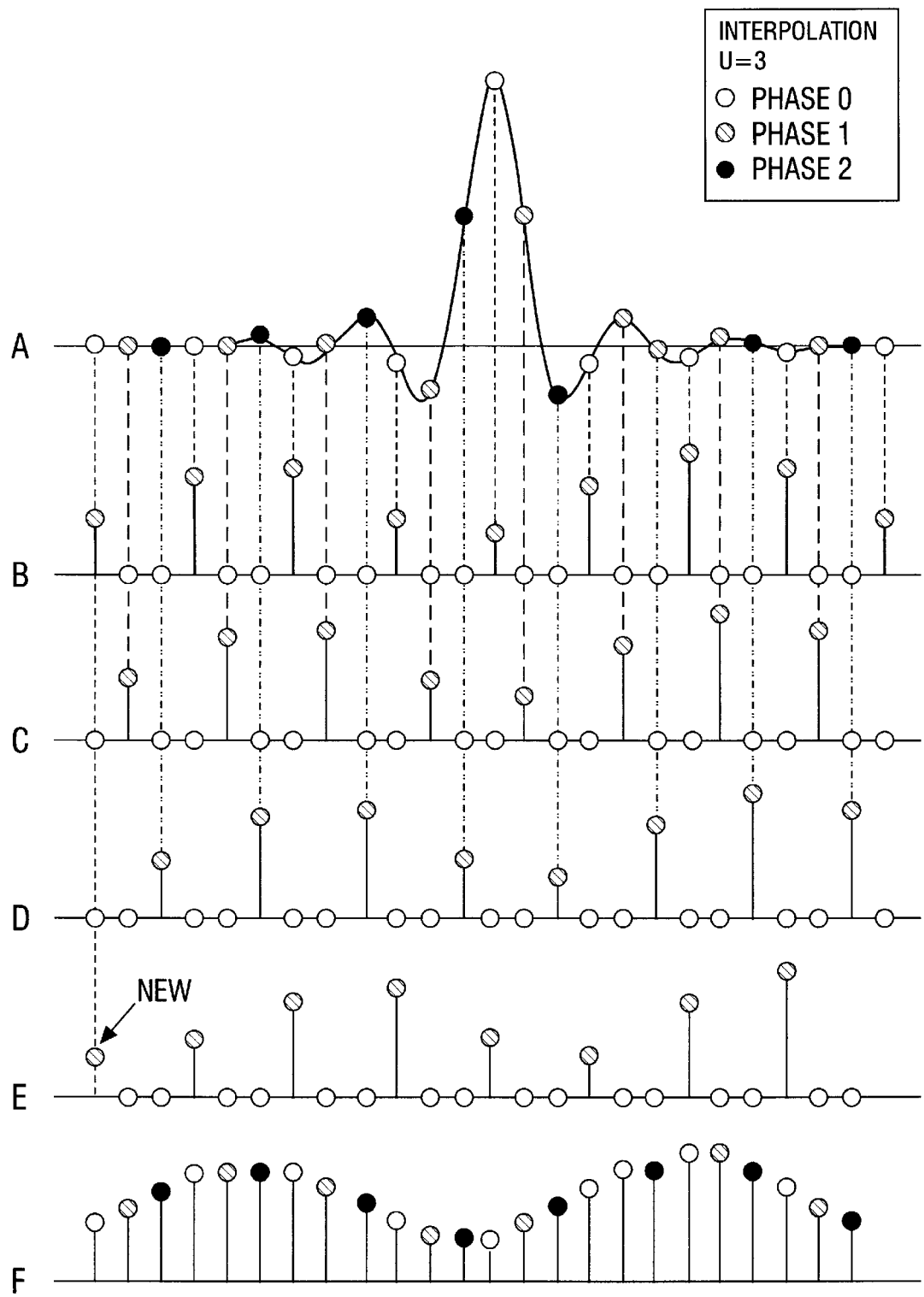
FIG. 2 comprises a series of timing diagrams, (a)–(f), that conceptually illustrates an exemplary interpolation implementation of the present invention, for a particular set of conditions.
Figure 3:
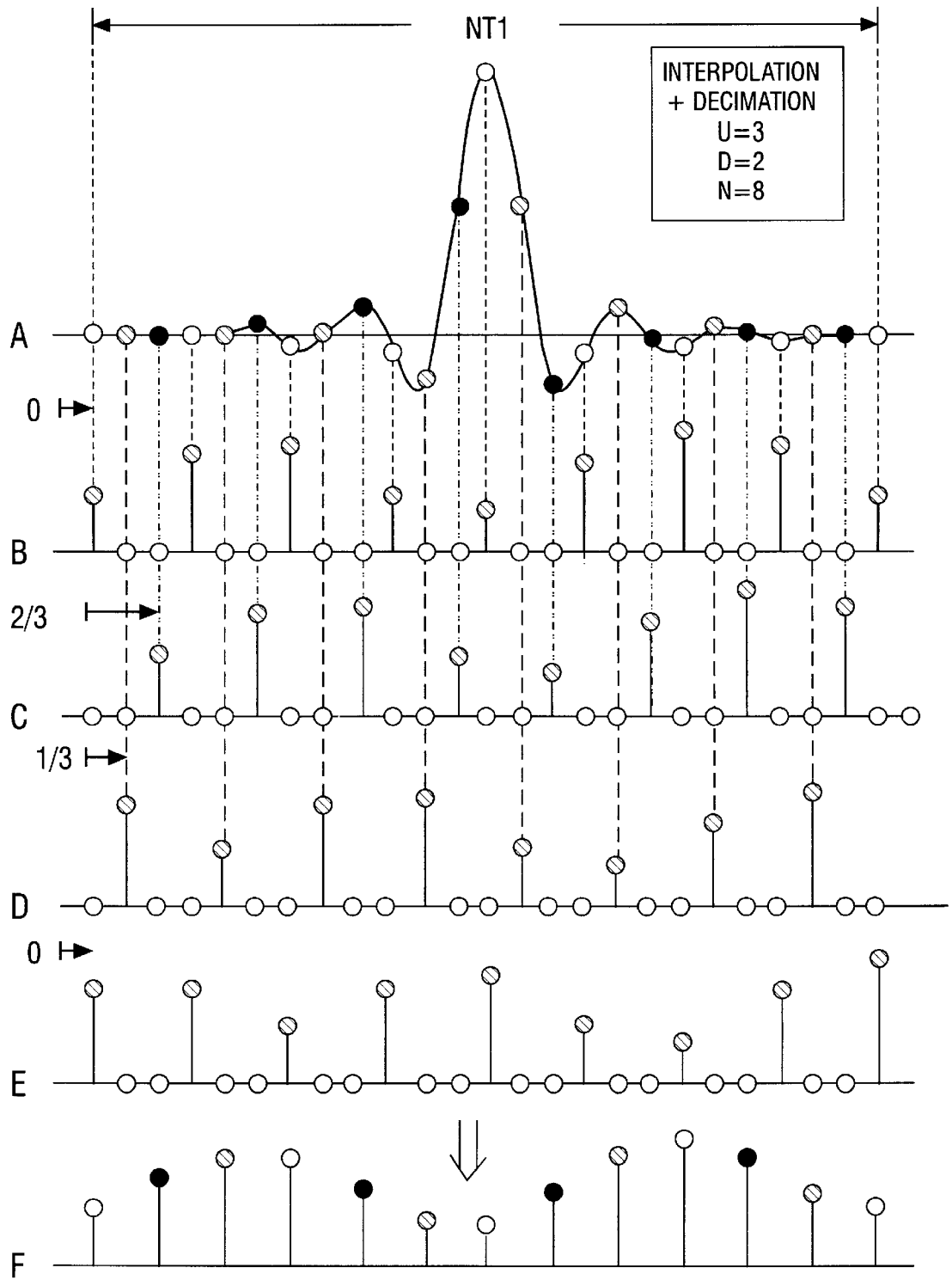
FIG. 3 comprises a series of timing diagrams, (a)–(f), that conceptually illustrates another interpolation implementation of the present invention, for a different set of conditions.
Figure 4:
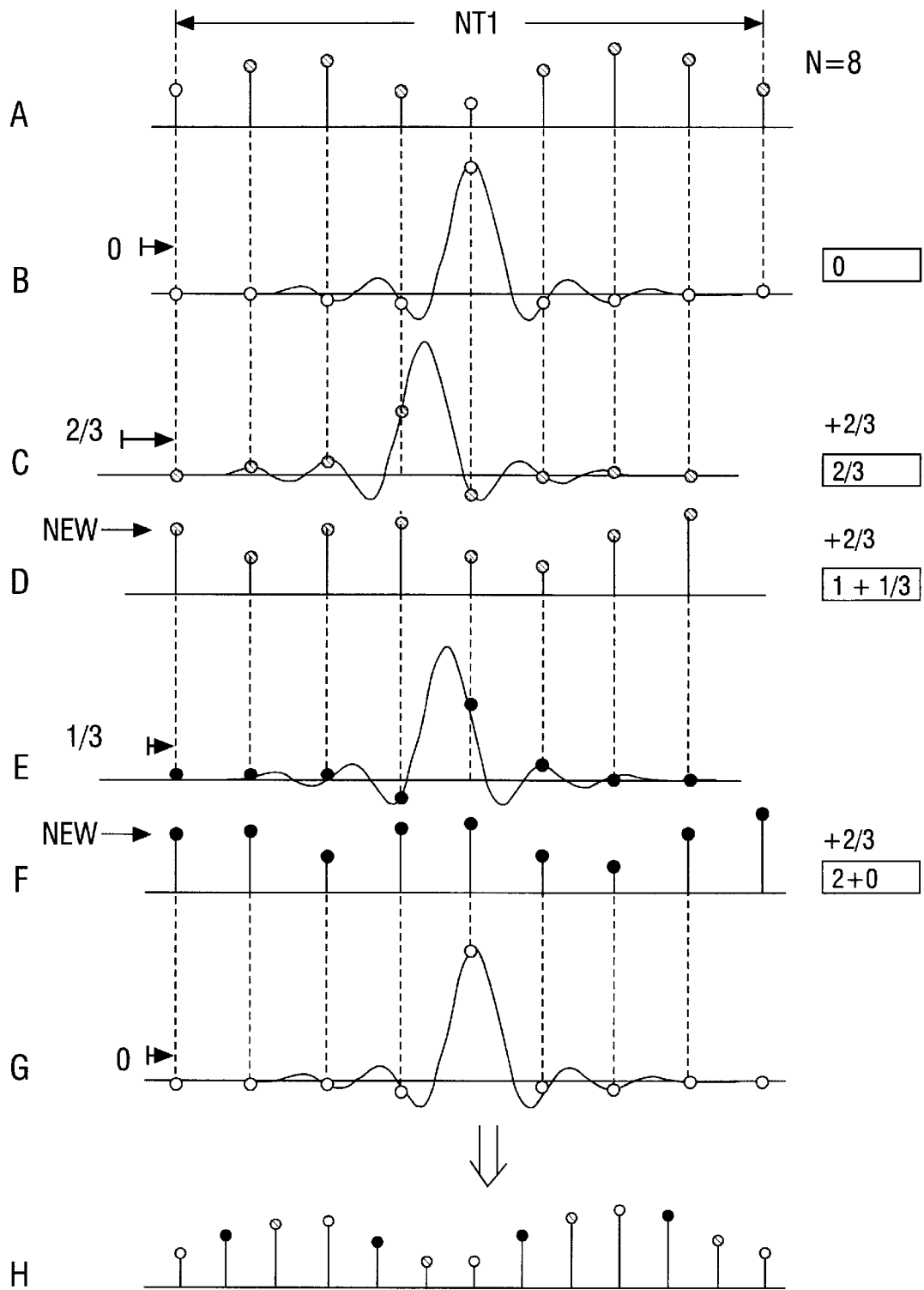
FIG. 4 comprises a series of timing diagrams, (a)–(h), that conceptually illustrates an interpolation implementation of the present invention, for the set of conditions of FIG. 3 but with reference to the input data.

Turning now to FIGS. 2–4, a conceptual perspective of the filtering operation depicted in FIG. 1 is provided for different sampling rate environments. In FIG. 2, the timing diagrams illustrate the processing of the input data samples for the interpolation (low-pass) filter (26 of FIG. 1), assuming a polyphase implementation with three phases being used for a situation in which:

$$fs2/fs1=U/D=3.$$

Each of the phases, respectively corresponding to the white circles (phase 0), the gray circles (phase 1), and the cross-hatched circles (phase 2), corresponds to a subset of filter coefficients which are used to obtain the impulse response of the data input to the filter.

In general, conversion by U/D corresponds to an interpolation process in which an up conversion by a factor of "U" is followed by a down conversion by a factor of "D," with the up conversion corresponding to stuffing U-1 zeros into the data stream between data samples followed by filtering, and the down conversion corresponding to decimating or filtering followed by discarding D-1 samples of the resulting data stream. Thus, for the application example of FIG. 2, U=3 and D=1, and the interpolation filter 26 up-samples by a factor of 3. In the application example of FIG. 3, U=3 and D=2, and the interpolation filter 26 up-samples by a factor of 3 and down converts by a factor of 2.

For FIG. 2, with U/D=3, up-sampling requires that two zeros are inserted per input sample, and the interpolation filter provides an FIR filtering function of duration $NT1=N/fs1$, where N is the size of both the filter and the delay line and T1 is period of the original input data before up-sampling. The length of the impulse response determines the cutoff frequency and attenuation, and the actual number of samples used in the filtering is 3N.

The first diagram, (a) of FIG. 2, illustrates the impulse response of the interpolation (low-pass) filter. The white, gray, and cross-hatched circles of diagram (a) correspond to each of the three phases, as described above. The data shown in timing diagram (b) of FIG. 2 are used to obtain the first output sample, as shown in the far left of timing diagram (f) of FIG. 2. The inherent delay has not been shown. The first output sample is obtained using the first subset of filter coefficients by filtering the non-upsampled input through the interpolation filter. Thus, "phase 0" of FIG. 2, corresponding to the white circles, is depicted on the far left of the impulse response, which is diagram (a) of FIG. 2. Only nonzero input samples need to be used, so only the impulse response values corresponding to these samples are needed. This corresponds to filtering the original data with a subset of coefficients.

For the next two phases ("phase 1" and "phase 2" of FIG. 2), the same non-zero samples are used, except that different subsets of coefficients are used for the impulse response. The processing with these different subsets of coefficients respectively corresponds to timing diagrams (c) and (d) of FIG. 2. In timing diagram (c), the input data are shown shifted to the right by T1/3, so that the same first input data sample is processed by the second set of filter coefficients, which corresponds to the gray circle in diagram (a) directly above this data sample. In timing diagram (d), the input data are shown shifted again to the right by T1/3, so that the same first input data sample is processed by the third set of filter coefficients, which corresponds to the cross-hatched circle in diagram (a) directly above this data sample. As this set of data is shifted within the delay line 28, the detector (22 of FIG. 1) does not permit new data to be shifted from the input buffer into the filter until the third shift (3×T1/3). The corresponding output samples are shown as the second and third circles, respectively, from the left of timing diagram (f) of FIG. 2.

In timing diagram (e), the input data are shown shifted again to the right by T1/3, with a new input data sample being retrieved into the delay line, as shown on the far left of this timing diagram. This set of input data is then processed, as with the set of input data in diagram (b), by the first set of filter coefficients (phase 0). The corresponding output sample is shown as the white circle, which is in the fourth position from the left of diagram (f) of FIG. 2. The process then continues with the data shifted by T1/3 and processing via the next phase.

FIG. 3 illustrates a modified operation for conditions in which the sampling rate conversion requires decimation as well as interpolation. In this specific example, U=3 and D=2, and each of the diagrams (a) through (f) of FIG. 3 corresponds to the same three-phase processing of input data as described in connection with FIG. 2, but with the phases being executed in a different order. As shown in connection with diagram (b), the first computation uses the input data points convolved with samples obtained from the impulse response with an initial offset of 0 (phase 0) and spaced by T1 from each other. The first shift is by 2×T1/3, as shown in diagram (c), with two zeros effectively stuffed at the input end of the delay line. This set of input data is then processed by the third set of filter coefficients (phase 2). The corresponding output samples for phases 0 and 2 are shown as the first and second circles on the far left of diagram (f) of FIG. 3.

The next computation occurs when the input data has again been shifted by two clocks, which results in a new data sample being retrieved into the delay line. This is illustrated in diagram (d) of FIG. 3, with an initial offset of T1/3 into the impulse response of diagram (a) of FIG. 3. This results in coefficients being used for phase 1. The corresponding output sample is shown as the gray circle which is in the third position from the left of diagram (f) of FIG. 3. The corresponding output signal of diagram (f) has samples spaced by $T2=\frac{2}{3}T1$.

Accordingly, the same three phases are used as in the pure interpolation example of FIG. 2, but in the order of phase 0, phase 2 and then phase 1 for this example of FIG. 3. Effectively, this operation exemplifies interpolation by a factor of 3 (U=3) and decimation by a factor of 2 (D=2). In this instance, down-sampling by D involves discarding one out of every D samples.

Decimating generally involves the use of a decimation filter, not shown in the figures. When U is greater than D, as in the above examples, a decimation filter is not needed because it has a cut-off frequency higher than the cut-off frequency of the interpolation filter. If the interpolation filter is of the FIR type, the intermediate results do not have to be computed. When an output is not needed, the signal is shifted out of the filter with no further processing required.

FIG. 4 illustrates the same process and conditions as shown in connection with FIG. 3, but using the input data (diagram (a) of FIG. 4) as a reference rather than the impulse response that was used with FIG. 3. On the right side of FIG. 4, there is illustrated the accumulator 22' portion of the detector 22 of FIG. 1. The accumulator, which has an integer part and a fractional part, is initially loaded to zero. The fractional part gives the offset into the impulse response curve and, therefore, is used to select the phase and the subset of filter coefficients.

The first computation is performed as before with FIG. 3, using an initial offset of zero for phase 0, as shown in diagram (b) of FIG. 4. At this point, $R=\frac{2}{3}$ is added to the accumulator, which reflects the ratio estimate at the last FS2 clock transition. The next calculation is done still with the same data, but with an offset of ⅔ of T1 to get phase 2, as shown in diagrams (c) and (d) of FIG. 4. This same value of ⅔ is added to the accumulator again, which results in an integer part of 1 and a fractional part of ⅓. Because the integer part of the accumulator increments, a new data sample is retrieved into the delay line as shown at the far left of diagram (d) and the output is computed with coefficients selected according to the fractional part, in this instance, ⅓ or phase 1, as shown in (e). The next increment of ⅔ yields an integer part of 2 and a fractional part of 0, causing another new data sample to be retrieved, and using an offset of zero or phase 0. This is shown in diagrams (f) and (g) of FIG. 4.

The process continues indefinitely, with each of the phases being processed on a cyclical basis and with the computations synchronized to the output clock FS2 and with inputs arriving at a rate synchronized to the input clock FS1.

Figure 5:
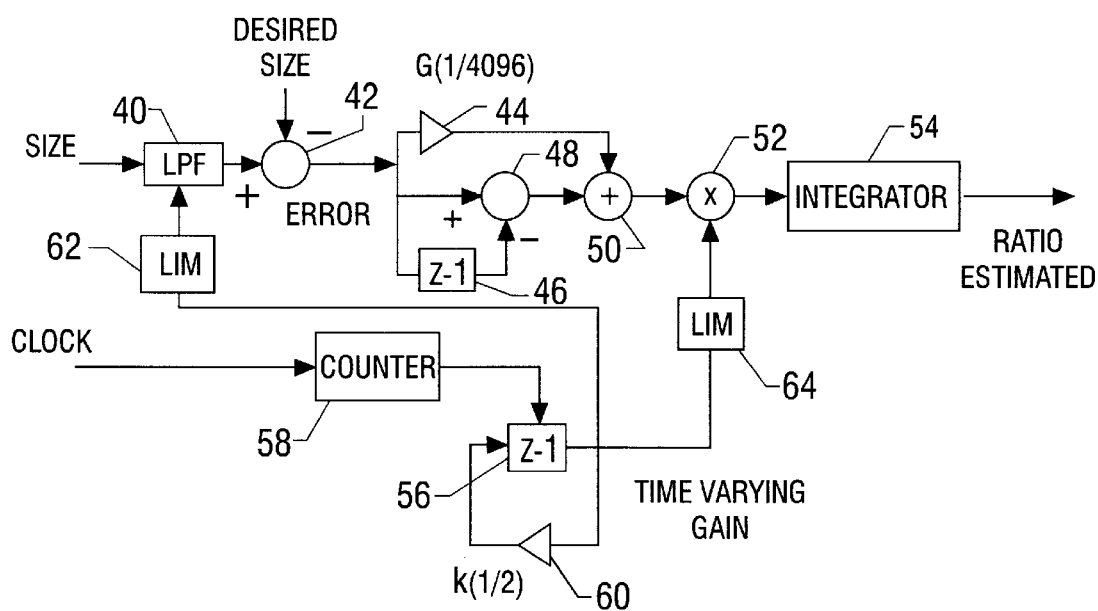
FIG. 5 is an exploded view of the ratio estimator arrangement depicted in FIG. 1.

Referring now to FIG. 5, a specific implementation of the ratio estimator 20 of FIG. 1 is shown in exploded block form, to illustrate one manner in which the ratio estimator is constructed using discrete integrated circuitry or using a programmed digital signal processor. The ratio estimator can be viewed as including three main sections. The first section is a recursive low-phase filter (LPF) 40 which is used to provide a smoothed estimate of the size of the input buffer (depicted as "FIFO" in the figures). By its very nature, the FIFO size input to the LPF 40 is incremented or decremented by a course value of plus or minus one. The long term average which is output from the LPF 40 is compared to a desired FIFO steady state size via a subtractor circuit 42 to create an error signal at the output of the LPF 40. This error signal indicates the difference between the actual size and the preselected desired size of the FIFO.

The second main section of the ratio estimator of FIG. 5 is a network including circuitry for developing the error signal into a proportional component and a derivative component, and then applying the signal to an integrator to form the new estimate of R. The proportional component, that is provided by a scaling circuit 44, e.g., scaling down by a factor of $2^{12}$, allows the input signal to be adjusted to the desired value, and any steady-state deviation from this value results in a change of the correct polarity being applied to R.

The derivative component, which is provided by a storage register 46 and a subtractor circuit 48, speeds up the convergence by indicating the rate of change of the error. The storage register 46 stores the previous value of the error generated by the subtractor circuit 42 after the last transition in the FS1 clock signal. The subtractor circuit 48 subtracts this previous value from the current value of the error and gives a first-difference approximation to the derivative. If the size is changing rapidly in one direction, e.g., increasing, then a correction proportional to the rate of change is applied to R. The proportional and derivative components are then combined at a summing circuit 50 and mixed at a multiplier circuit 52, with the output of the third main section, before the processed output signal is integrated by an integrator 54. Because the integrator 54 acts on a proportional and a derivative component, the resultant estimate is modified by an integral component and a proportional component, effectively acting as a type of proportional integral controller.

This third main section provides time-varying gain, which affects both the gain of the error signal applied to the integrator 54 and the time constant of the low-pass filter 40. This is accomplished using a time-varying gain circuit or register 56, which responds to a cycle-count signal and a scalar signal. The cycle-count signal is provided by a counter 58 which counts FS1 cycles and, therefore, provides an indication of the speed at which the input buffer is filling.

The scalar signal is provided by scaling circuit 60 which reduces the gain by a factor k (for example, ½) every M samples. Each time the counter 58 reaches its programmed threshold, e.g., 1024 cycles or counts, the counter 58 loads the time-varying gain circuit 56 with the previous gain scaled by the factor. This provides a rapid first adjustment, for example, an initial gain of 1/32, after which the response of the loop is slowed down to allow only small modifications to the estimate. Limit (LIM) circuits 62 and 64 prevent the gain from becoming smaller than certain minimum values which, in general, are different for the LPF 40 and for the integrator 54. For example, in a particular embodiment, the minimum value for the input to the LPF 40 is 1/512, and the minimum value for the input to the integrator 54 is 1/4096.

Several parameters can be adjusted to meet the specified application. These adjustable parameters include, for example, the initial gain value provided by the gain circuit 56, the factor k by which the initial gain value is reduced, the interval between gain changes via the counter 58, and the final (limit) gain values. The desired size of the input buffer, and the gain of the integral error component can also be adjusted.

The ratio estimator is clocked at the input rate, which allows the processing to be done at the slower rate. Accordingly, the FIFO size is observed by the low-pass filter only when it is loaded, so the actual size can be lower by one, because data can be read from the FIFO inbetween input clocks.

Figure 6:
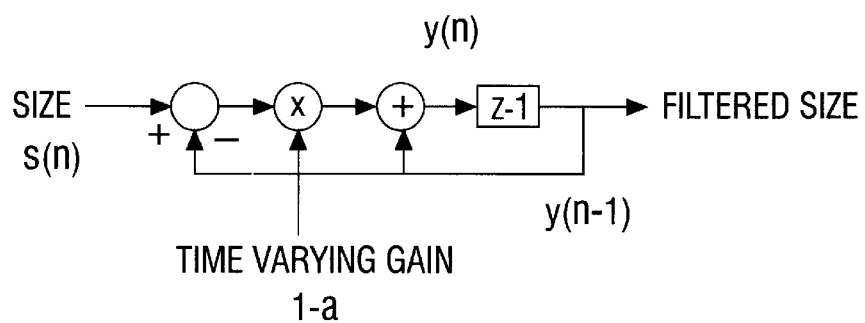
FIG. 6 is an exploded view of the low-pass filter arrangement depicted in FIG. 5.

The LPF 40 of FIG. 5 is shown in exploded block diagram form in FIG. 6. As with the block diagram for the ratio estimator, this block diagram for the LPF 40 provides a guide for programming a digital signal processor. The LPF 40 obeys the general time-domain equation:

$$y(n)=(1-a)*x(n)+a*y(n-1),$$

and has the general transfer function:

$$H(z)=Y(z)/X(z)=(1-a)/(1-az^{-1}).$$

For the specific implementation illustrated in connection with FIGS. 5 and 6, the LPF 40 provides an output y(n) as follows:

$$y(n)=y(n-1)+(1-a)[s(n)-y(n-1)],$$

where "s(n)" is the input buffer size as observed by the LPF 40 when it is loaded, and (1-a) is other input to the LPF 40 which is used to set its time constant.

Figure 7:
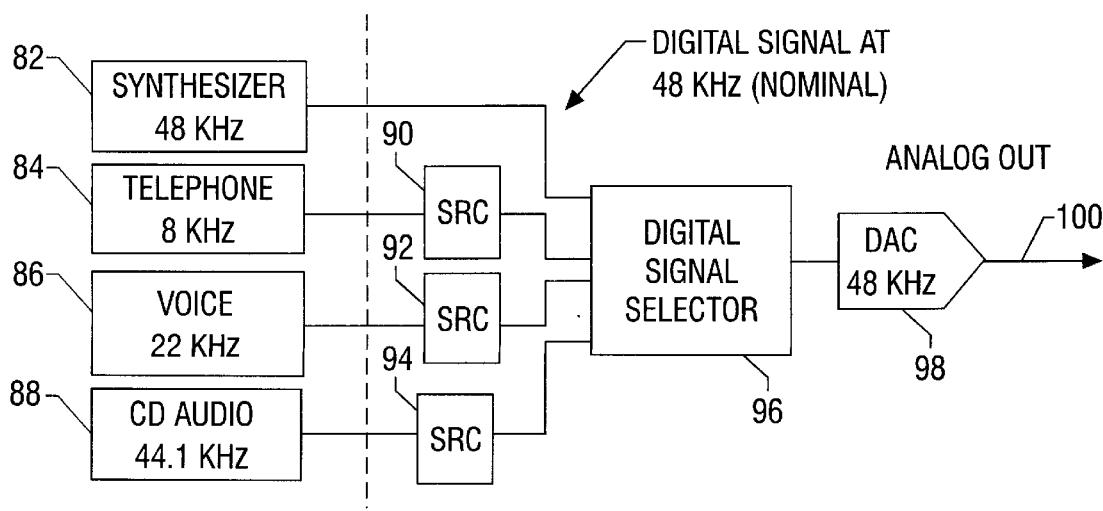
FIG. 7 is an illustration of an example application, according to a system implementation of the present invention.

Referring now to FIG. 7, an example application of the present invention is illustrated. In this specific system of FIG. 7, four different types of signal generators are shown as providing different types of digital input signals. The first input signal is generated by a synthesizer 82, which produces the signal at a rate of 48 KHz. The three remaining signal generators include a telephone circuit 84 producing a digital signal at a rate of 8 KHz, a voice translation circuit 86 carrying a voice signal on a carrier frequency at a rate of 22 KHz, and a compact disk audio generator 88 carrying an audio signal at a rate of 44.1 KHz. Each of these latter three signals is processed by a signal converting circuit, for example, according to the FIG. 1 embodiment of the present invention. Thus, for each of these latter signals, signal rate converter circuits 90, 92 and 94 are shown. The respective outputs of the signal rate converters 90, 92 and 94 are received, along with the signal generated by the synthesizer 82, by a digital signal selector circuit 96. The digital signal selector circuit can be implemented in the form of a conventional signal multiplexer circuit, or can be implemented to mix samples using conventional techniques, to an output port of the digital signal selector circuit 96.

By configuring each of the signal rate converter circuits 90, 92 and 94 to convert the respective inputs to an output signal having a data rate of 48 KHz, a digital-analog-converter 98 can be used to condition, amplify and present an analog output signal 100 to one or more external data recovery terminals. This type of system is advantageous in that it requires no analog circuits before the digital-analog-converter 98. This is in contrast to a conventional approach in which a digital-analog-converter is used for each source, each operating at a sampling rate equal to that of the input signal. Using this conventional approach, the additional circuitry that is required is burdensome to implement with integrated circuits due to size, tolerance, and other constraints associated with analog circuitry.

According to a particular embodiment, a sampling rate converter for an initial R estimate, or nominal ratio, of 6/11, includes the following parameters: the FIFO size is 3; the initial gain provided by gain circuit 56 is set at 1/32; the interval between gain updates provided by the counter 58 is 1024 samples; the gain of the scaling circuit 44 is 1/4096; and the limit values provided by circuits 62 and 64 are as previously indicated for a final gain of the loop at 1/4096, and the final gain of the LPF 40 at 1/512.

Accordingly, the present invention provides, among other aspects, a sampling rate conversion system and method for variably controlling the data throughput of an input buffer based on an estimate of the ratio between the input and output sampling rates. Other aspects and embodiments of the present invention will be apparent to those skilled in the art from consideration of the specification and practice of the invention disclosed herein. It is intended that the specification and illustrated embodiments be considered as exemplary only, with a true scope and spirit of the invention being indicated by the following claims.

What is claimed is:

1. In a system for converting an input signal, which is retrieved at a first rate according to a first clock signal, to an output signal generated at a second rate according a second clock signal, a data sampling conversion arrangement comprising:
   an input buffer circuit having a set of data storage registers arranged to pass received data samples at a variable rate;
   a current capacity signal generated by the input buffer circuit and indicative of current use of the set of data storage registers;
   a ratio estimation circuit arranged to respond to the current capacity signal by providing an estimate of the actual ratio between the first rate and the second rate; and
   a control circuit responsive to at least one of the first and second clock signals and to the ratio estimate circuit and arranged to control the variable rate at which the data storage registers pass the received data samples.

2. A data sampling conversion arrangement, according to claim 1, wherein the control circuit controls the variable rate at which the data storage registers store and pass the received data samples to inhibit the set of data storage registers from being over- or under-utilized.

3. A data sampling conversion arrangement, according to claim 1, wherein the set of data storage registers is arranged to provide first-in-first-out access to the received data samples.

4. A data sampling conversion arrangement, according to claim 1, wherein the current capacity signal from the input buffer circuit indicates a quantity of the data storage registers that are currently storing received data samples.

5. A data sampling conversion arrangement, according to claim 1, wherein the current capacity signal from the input buffer circuit indicates a quantity of the data storage registers that are not currently storing received data samples.

6. A data sampling conversion arrangement, according to claim 1, wherein the ratio estimation circuit provides a ratio signal.

7. A data sampling conversion arrangement, according to claim 6, wherein the ratio estimation circuit provides the ratio signal as a function of the current capacity signal and the first rate.

8. A data sampling conversion arrangement, according to claim 6, wherein the ratio estimation circuit provides the ratio signal as a function of the current capacity signal and the second rate.

9. A data sampling conversion arrangement, according to claim 1, wherein the control circuit includes an accumulator arranged to accumulate a value corresponding to the estimate of the ratio of sampling rates.

10. A data sampling conversion arrangement, according to claim 9, wherein the control circuit includes an increment detection circuit arranged to respond to the accumulator exceeding a threshold level by indicating that the input buffer circuit is to pass at least one of the received data samples.

11. A data sampling conversion arrangement, according to claim 1, wherein the input buffer circuit includes a first-in-first-out memory circuit having no more than five registers used during normal operation.

12. A digital signal processing system for processing an input signal received at a first rate and converting the input signal to an output signal generated at a second rate, comprising:
    a first-in-first-out input buffer circuit having a set of data storage registers arranged to receive data samples for storage at the first rate and to pass the received data samples from the input buffer circuit at a controlled rate;
    a current capacity signal generated by the input buffer circuit and indicative of current use of the data storage registers;
    a frequency ratio estimation circuit arranged to respond to the current capacity signal by providing an estimate of the actual ratio between the first rate and the second rate;
    a control circuit, responsive to the frequency ratio estimation circuit, for generating the controlled rate at which the data samples are to be passed from the input buffer circuit; and
    a digital processing circuit constructed and arranged to receive the data samples passed from the input buffer circuit at the controlled rate and to output corresponding processed data samples at the second rate.

13. A digital signal processing system, according to claim 12, wherein the frequency ratio estimation circuit responds to both the current capacity signal and to a clock signal corresponding to the first rate.

14. A digital signal processing system, according to claim 12, wherein the control circuit includes an accumulator circuit and a threshold subtractor circuit.

15. A digital signal processing system, according to claim 14, wherein the digital processing circuit includes a digital filter.

16. A digital signal processing system, according to claim 15, wherein the digital filter is an interpolation filter.

17. A digital signal processing system, according to claim 15, wherein the digital filter is a finite impulse response filter.

18. A digital signal processing system, according to claim 15, wherein the digital filter is an interpolating finite impulse response filter.

19. A digital signal processing system, according to claim 18, wherein the digital filter is constructed and arranged to up-sample by inserting data into the passed data samples and to down-sample by discarding data from the passed data samples.

20. A digital signal conversion arrangement for converting an input signal received at a first rate to an output signal generated at a second rate, comprising:

buffer means, including a set of data storage registers, for receiving data samples for storage at the first rate and passing the received data samples from the buffer means at a controlled rate;

current capacity signaling means for indicating the current use of the data storage registers;

frequency ratio means, responsive to the current capacity signaling means and the first rate, for estimating the actual ratio between the first rate and the second rate;

control means, responsive to the frequency ratio means, for generating the controlled rate at which the data samples are to be passed from the buffer means; and digital signal processing means for receiving the data samples passed from the buffer means at the controlled rate and outputting the data samples, as processed by the digital signal processing means, at the second rate.

21. A digital signal conversion arrangement for converting an input signal received at a first rate to an output signal generated at a second rate, comprising:

a first-in-first-out buffer circuit, including a set of data storage registers, arranged to receive data samples for storage at the first rate, to pass the received data samples from the buffer circuit at a controlled rate, and to generate a current capacity indication;

a filter circuit arranged to respond to the current capacity indication by providing a rate of error signal;

a time-varying gain circuit arranged to respond to one of the first and second rates;

an integrator arranged to respond to the rate of error signal and the time varying gain circuit by providing an estimate of the ratio between the first rate and the second rate;

a control circuit responsive to the estimate of the ratio between the first rate and the second rate and constructed to generate the controlled rate at which the data samples are to be passed from the buffer circuit; and processing means for receiving the data samples passed from the buffer circuit at the controlled rate and outputting the data samples at the second rate.

22. A digital signal conversion arrangement, according to claim 21, wherein the first rate is less than the second rate.

23. A method for converting an input signal received at a first rate to an output signal generated at a second rate, comprising:

using a set of data storage registers as an input buffer for receiving data samples for storage at the first rate and for passing the received data samples from the input buffer at a controlled rate;

providing a quantity signal to indicate the quantity of the data samples that are currently stored in the set of data storage registers;

in response to the quantity signal, estimating the actual ratio between the first rate and the second rate;

in response to estimating the actual ratio, generating the controlled rate at which the data samples are to be passed from the set of data storage registers and outputting the data samples at the second rate.

24. A method, according to claim 23, wherein estimating the actual ratio between the first rate and the second rate includes monitoring the first rate and the quantity of the data samples that are stored in the input buffer.

25. A communications system, comprising:

a plurality of signal generators, each signal generator providing an input signal at an output port of the signal generator;

for each of the signal generators, a data sampling conversion arrangement including an input buffer circuit having a set of status storage registers arranged to receive data samples from the input signal at a variable rate, the data samples being received at a first rate according to a first clock signal, a current capacity signal generated by the input buffer circuit and indicative of current use of the set of data storage registers, a data clocking circuit arranged to generate a second clock signal, a ratio estimation circuit arranged to respond to the current capacity signal by providing an estimate of the actual ratio between the first rate and a second rate defined in synchronism the second clock signal, a control circuit response to at least one of the first and second clock signals and to the ratio estimation circuit and arranged to control a variable rate at which the data storage registers pass the received data samples, and a signal conditioning circuit arranged and constructed to respond to the data samples passed by the data storage registers and to provide an output signal in response thereto having a second rate defined in synchronism with the second clock signal; and a multiplexer, responsive to the signal conditioning circuit, arranged to pass the output signal for one of the signal generators according to an established protocol.

26. A communication system, according to claim 25, wherein the signal conditioning circuit includes a filter.

27. A communication system, according to claim 25, wherein the signal generator generates the input signal as representing audio data.

28. A communication system, according to claim 25, wherein the second rate is greater than the first rate.

29. A communication system, according to claim 25, wherein the audio data is generated at the output port of a signal generator in analog form.

30. A communication system, according to claim 25, wherein the set of data storage registers is arranged to provide first-in-first-out access to the received data samples.

31. A communication system, according to claim 25, wherein the ratio estimation circuit provides the ratio signal as a function of the current capacity signal and the first rate.

32. A communication system, according to claim 25, wherein the control circuit includes an accumulator arranged to accumulate the value corresponding to the estimate of the ratio of sampling rates and further includes a detection circuit arranged to respond to the accumulator exceeding a threshold level by indicating that the input buffer circuit is to pass at least one of the received data samples.

* * * * *